July 16, 1963  R. L. DEGA  3,097,521
GAUGING APPARATUS AND METHOD FOR MEASURING SEAL QUALITY
Filed Nov. 10, 1958  5 Sheets-Sheet 3
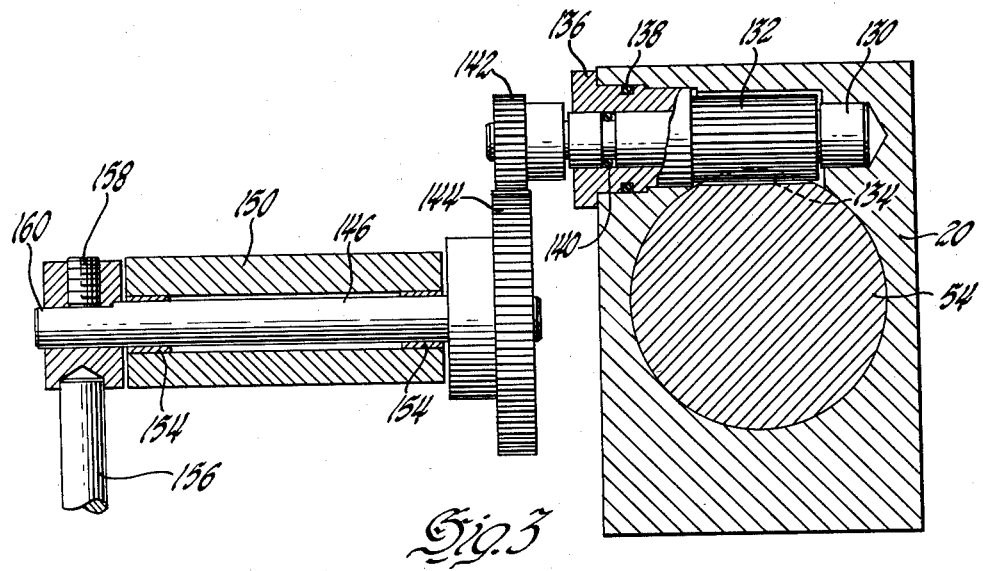
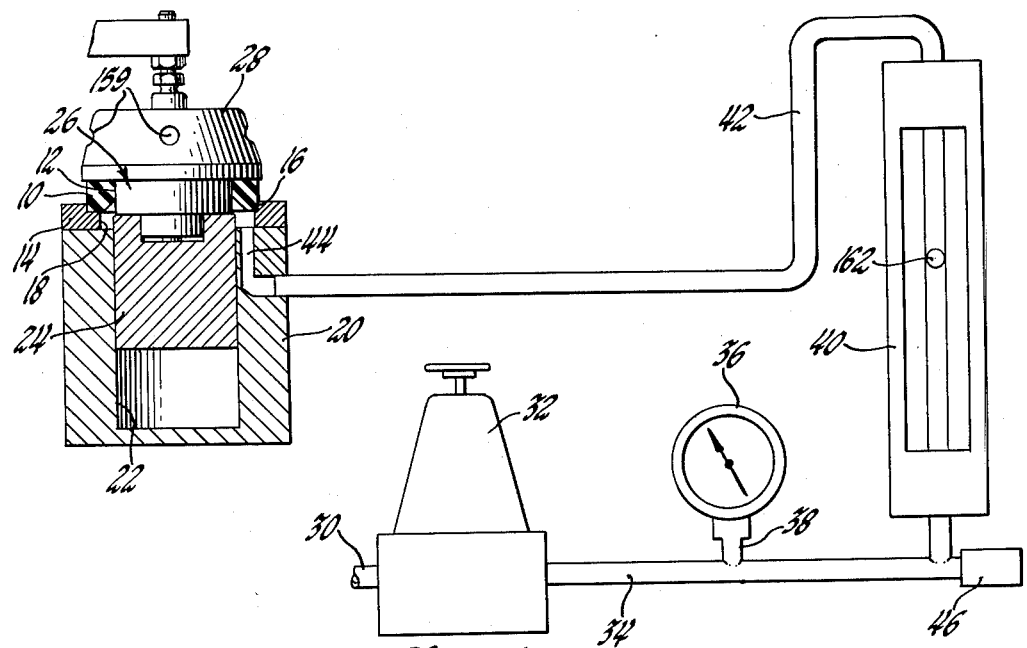
INVENTOR.
Robert L. Dega
BY
ATTORNEY

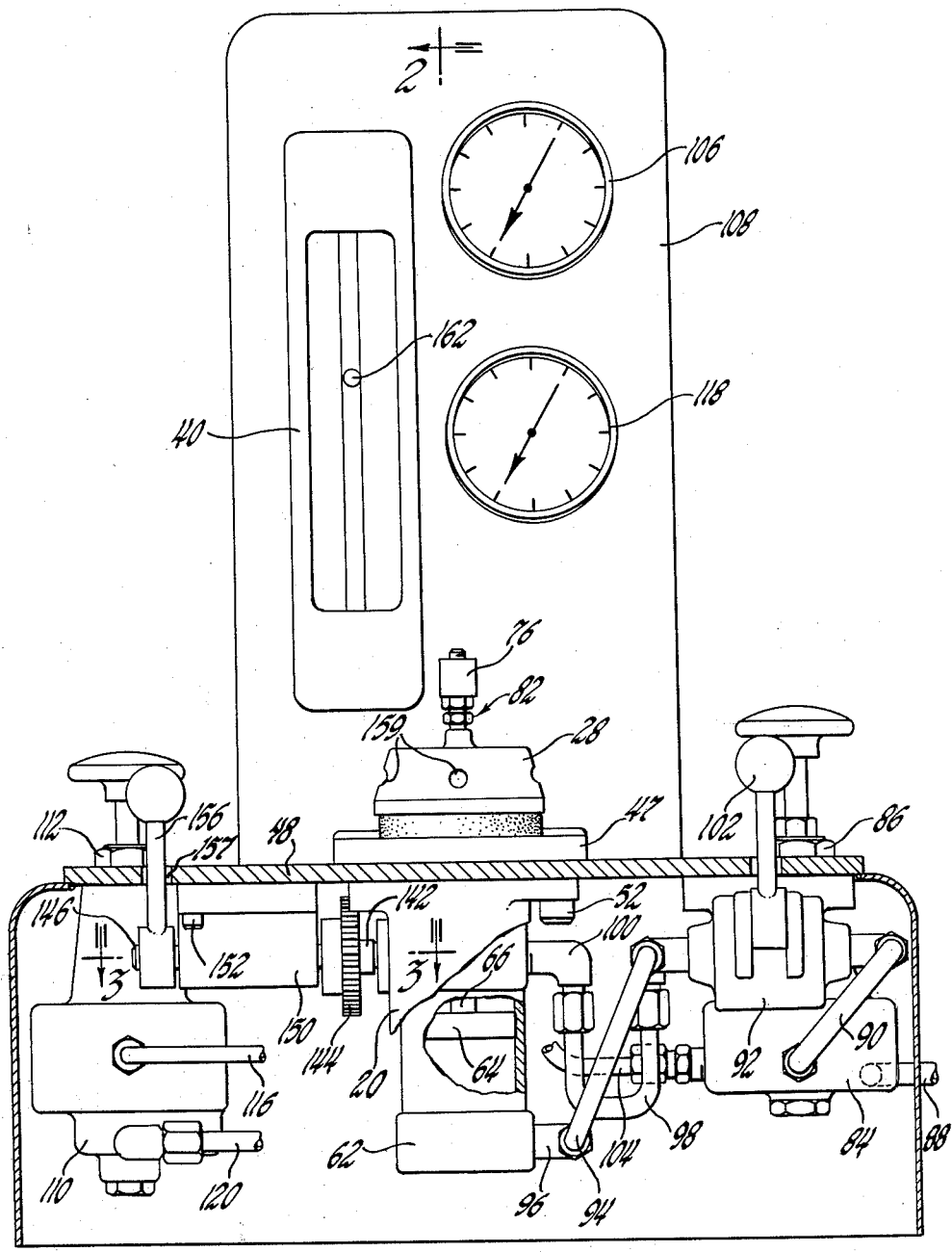

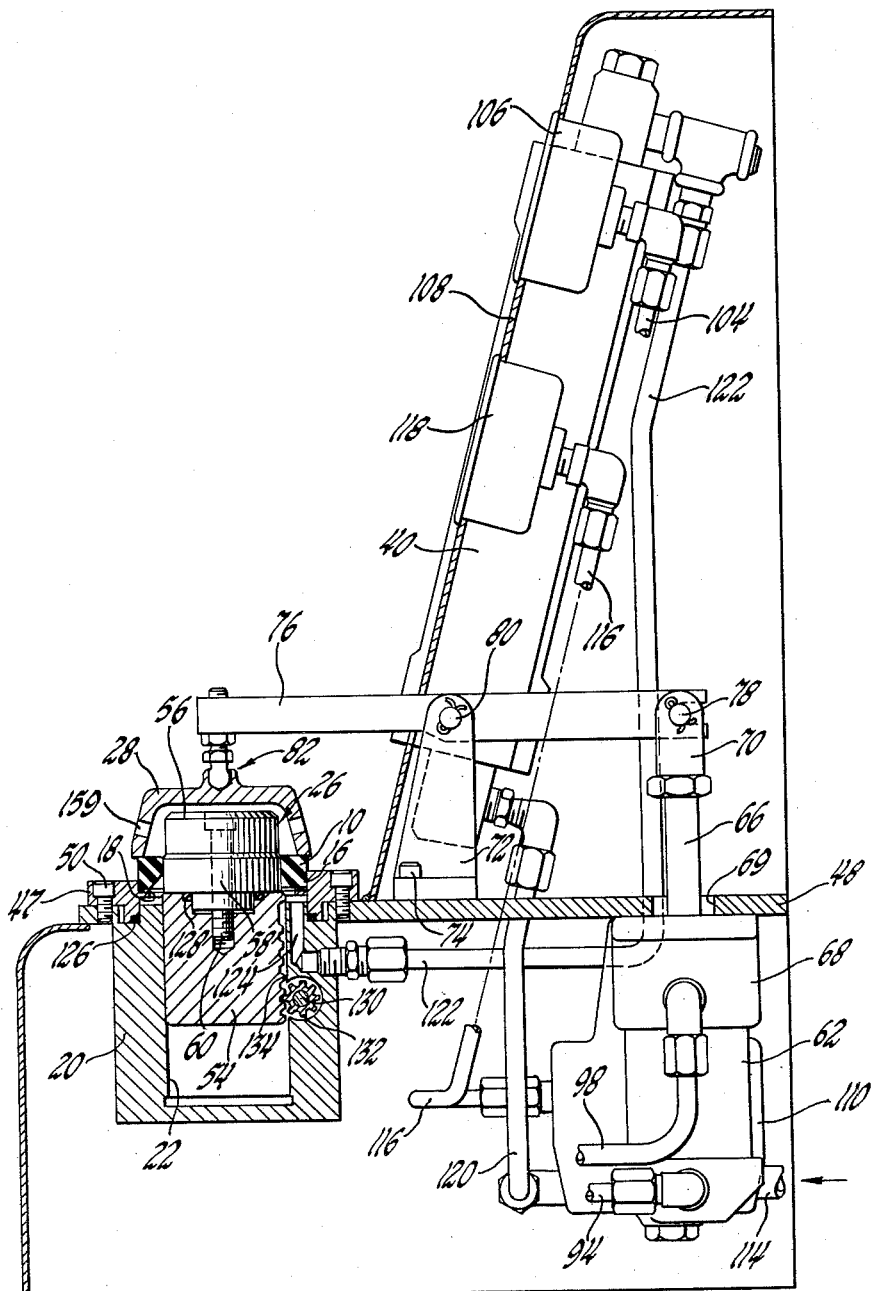

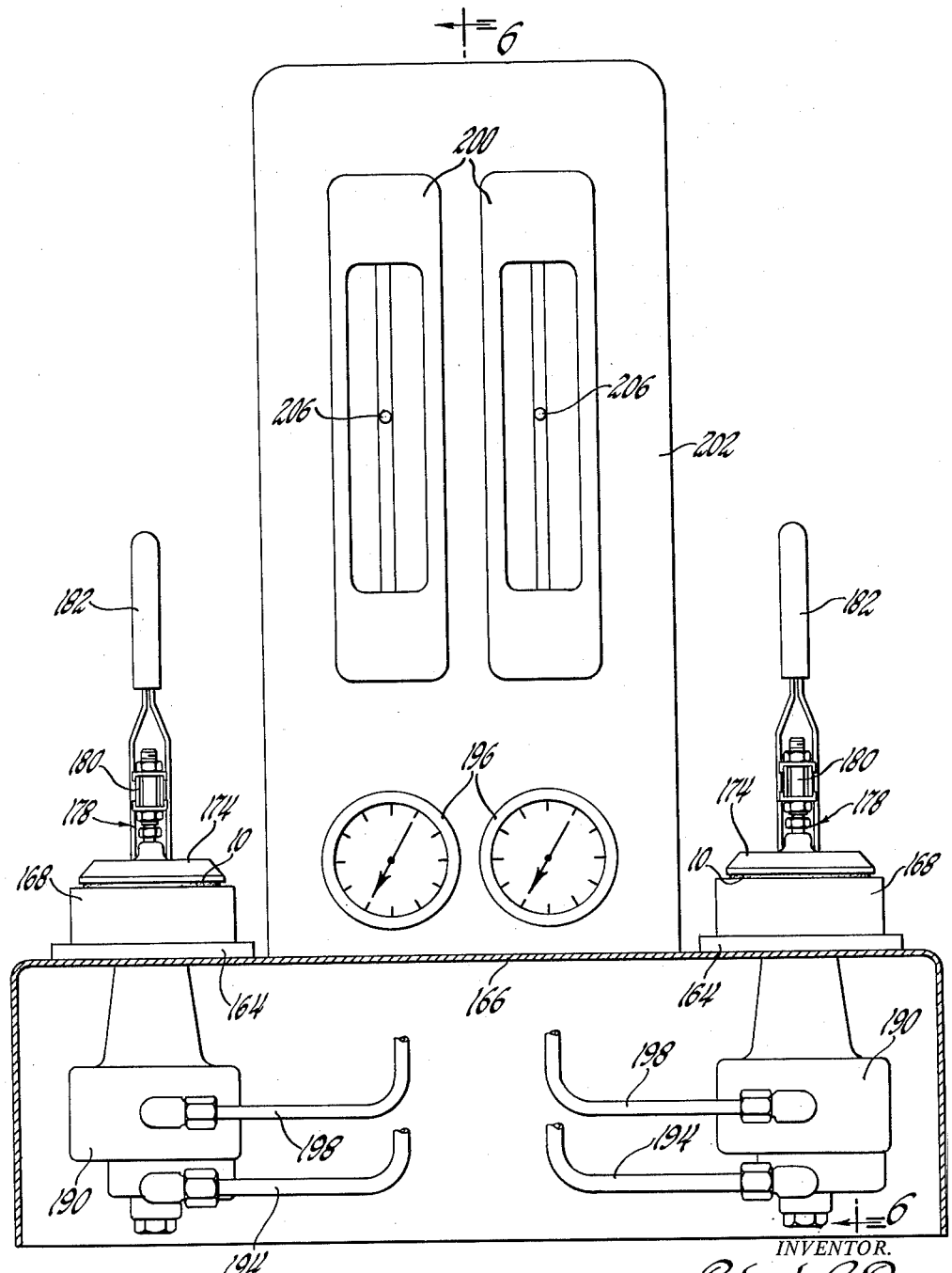

July 16, 1963 R. L. DEGA 3,097,521
GAUGING APPARATUS AND METHOD FOR MEASURING SEAL QUALITY
Filed Nov. 10, 1958 5 Sheets-Sheet 5

INVENTOR.
Robert L. Dega
BY
ATTORNEY

United States Patent Office 3,097,521
Patented July 16, 1963

3,097,521
GAUGING APPARATUS AND METHOD FOR MEASURING SEAL QUALITY
Robert L. Dega, Utica, Mich., assignor to General Motors Corporation, Detroit, Mich., a corporation of Delaware
Filed Nov. 10, 1958, Ser. No. 772,858
21 Claims. (Cl. 73—40)

This invention relates to shaft seals and more particularly to an apparatus for determining the quality of shaft seals used on a production basis.

When seals are employed to prevent oil or fluid leakage along a shaft it is important that the seal can be accurately formed and properly suited to the shaft with which it is to be used. There are a large number of variables involved in designing and manufacturing a seal, any one of which can cause a seal to leak if not properly designed or built into the seal. A lip type seal, for example, is dependent for a good fit on such variables as lip diameter, lip pressure, concentricity, elasticity, etc. Each of the variables requires close attention in the design and manufacture of the seal and inconsistencies in any one variable are greatly multiplied when a seal is produced on a quantity basis.

Heretofore, no convenient method has been presented which offers the seal user a way to check for the accurateness and precision of a group of production seals. Generally, a group of seals is spot checked to determine the various individual parameters, usually with poor results due to the volume of checking necessary, the type of checking carried out and the amount of variation in a group of seals. Again using a lip type seal as an example, the seal is formed of a resilient material which makes measurement by any instrumentation extremely difficult.

It has been proposed to measure a seal diameter by measuring a magnified and projected shadow, and further proposed to use optical micrometry in making such measurements. Both of these methods have proven too tedious and time consuming to be of any value for production measurement.

The device in which this invention is embodied makes possible a relatively simple and inexpensive method of production control of the quality of shaft seals. Instead of attempting to measure each of the variables involved, the device allows determination of the seal quality through fluid flow which is a function directly affected by any and all of the seal variables. In utilizing the device, a seal may be placed on a stub shaft of a diameter equal to the diameter of the shaft with which the seal is to be used, clamped in its proper position and a fluid, such as air, passed between the seal and the shaft. The amount of air flow is a direct indication of whether or not the seal will leak when used in a production installation. Although the parameters are not individually measured, it is sufficient for production quality control to know whether or not the seal will leak. The device may employ a pair of stub shafts having different diameters, or a single stub shaft having portions of different diameters, along the principle of a "go—no go" type gage. With a single stub shaft having portions of different diameters, means are supplied for raising and lowering the stub shaft into engagement with the seal without having to alter the air pressure entering the device.

Thus, a feasible and accurate means is provided which affords economical production quality control of shaft seals. The device is inexpensive and simple to operate, allowing a manufacturer greater savings due to rejected parts and later failure in production parts.

In the drawings:

FIGURE 1 is an elevational view of one modification of the device, with parts broken away and in section to show the location of the various parts.

FIGURE 2 is a cross sectional view of the device shown in FIGURE 1 taken substantially along the line 2—2 and looking in the direction of the arrows.

FIGURE 3 is a cross sectional view of that part of the device shown in FIGURE 1 which is adapted to raise and lower the stub shaft. FIGURE 3 is a view taken substantially along the line 3—3 of FIGURE 1.

FIGURE 4 is a diagrammatic view of the principle on which the device of FIGURE 1 is based.

FIGURE 5 is an elevational view of a second modification of the device with parts broken away and in section to illustrate the location of the parts.

Figure 6:
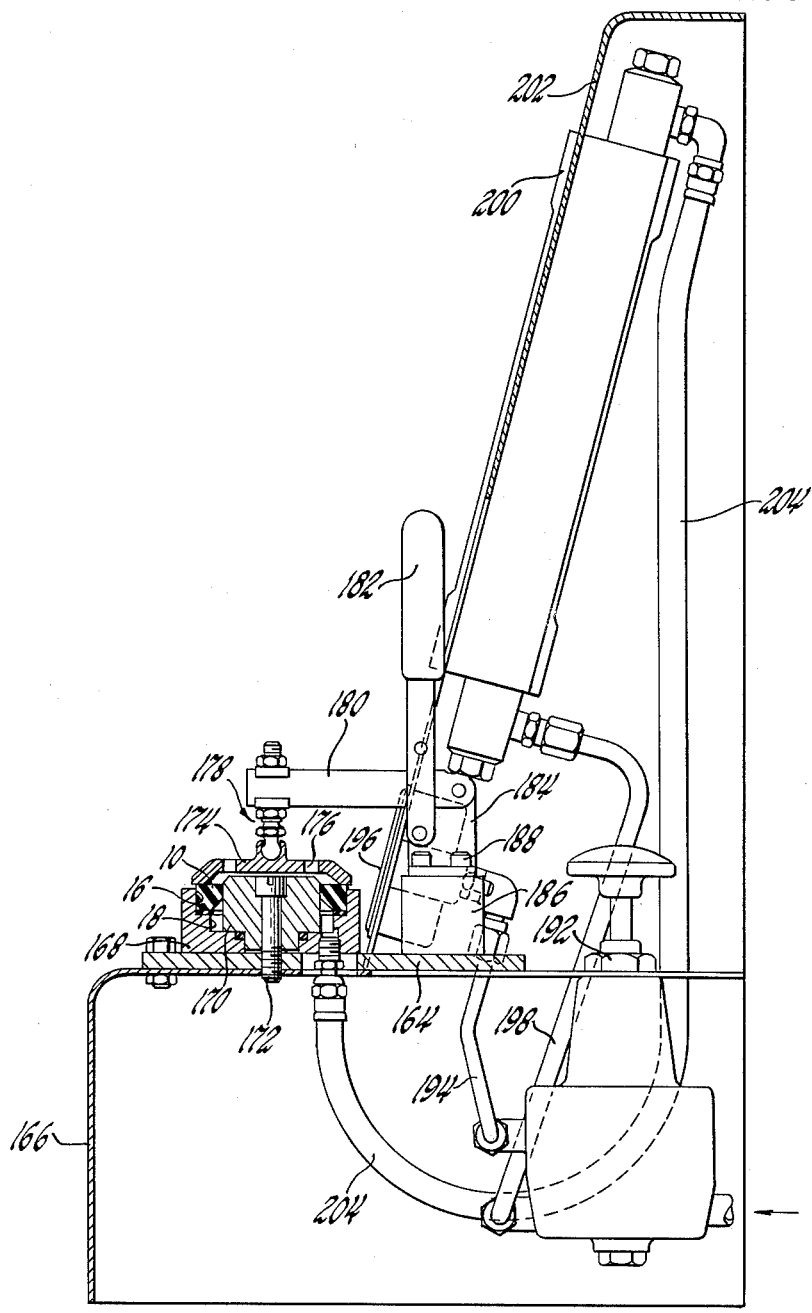
FIGURE 6 is a cross sectional view of the device shown in FIGURE 5 taken substantially along the line 6—6 and looking in the direction of the arrows.

Referring more particularly to the drawings, FIGURE 4 illustrates the principle on which the device is based. A seal 10, here illustrated as a lip type seal, has an inwardly projecting annular lip 12 adapted to abut the shaft and prevent the leakage of oil, or the like, therebetween. In checking the seal for leakage, the seal may be mounted in a receiving member 14 which has an inwardly stepped recess defining an annular recessed shoulder or seat 16 to receive the seal 10, and a lower stepped recess defining an annular chamber 18 beneath the seat 16 for a purpose to be described. The seal receiving member 14 is mounted in a convenient manner over a lower member 20 which has a cavity 22 formed therein. A shaft receiving block 24 is receivable in the cavity 22 and the stub shaft 26 is secured in the block 24. The stub shaft must be concentric with respect to the seal receiving recessed seat 16.

A clamping means, such as the perforated cup 28, may be actuated in any suitable manner and abuts and contains the seal 10, holding the seal in position in the member 14.

A fluid inlet conduit 30 passes air to a conventional pressure regulator 32 which in turn conveys the air to the conduit 34. A conventional pressure gage 36 may be used to determine the air pressure leaving the pressure regulator. The pressure gage 36 is connected to the conduit 34 by an inlet pipe 38. The conduit 34 then connects with a flow meter 40, of any well known type, through which the air passes to the conduit 42. The conduit 42 communicates with the lower member 20 and the passage 44, which in turn leads to the chamber 18 defined by the lower or inward step in the seal receiving member 14. In order to balance the diagrammatical system shown, an orifice bleed 46 is provided.

It will be noted that air conveyed through the pressure regulator, the flow meter, and into the chamber 18 will then pass between the stub shaft and the lip 12 of the lip seal 10, and the amount of fluid flow therethrough may be determined on the flow meter 40. A particular range of flow values may be designated as an acceptable limit with a particular seal, and so long as the flow between the seal 10 and the shaft 26 is within the designated range the seal is assumed to be acceptable.

FIGURES 1 and 2 illustrate an embodiment of the present invention for quality control of seals utilizing the above described principle. A seal retaining block 47, having the recessed seat 16 and the chamber 18, is secured to a table 48 by a plurality of bolts 50. A lower member 20 is also secured to the table, as by the bolts 52, and is axially aligned with respect to the retaining block 47. A chamber 22 is provided in the lower member 20 to receive the stub shaft retaining block 54. The stub shaft, illustrated generally by the numeral 26, consists of an upper cylindrical portion 56 and a lower cylindrical portion 58. The difference between the diameters of the portions 56 and 58 may be the maximum and minimum limits of an acceptable range of seal diameters for the seals being tested. The stub shaft 26 is secured to the block 54 by a bolt 60.

In order to retain the seal 10 in the retaining block 47, a clamping cup 28 is adapted to rest on the upper outer edge of the seal, as illustrated in FIGURE 2 and is actuated as hereinafter described to retain the seal in the block.

Secured to the table 48 in any suitable manner is an air or fluid cylinder 62 having a piston 64 reciprocable therein. A piston rod 66 extends from the upper face of the piston, through the cylinder head 68 and through an opening 69 in the table 48, terminating in a connecting link 70. A fulcrum post 72 is secured to the table, as by bolts 74, and is located between the piston rod 66 and the seal retaining block assembly 47. A beam 76 is pivotally secured to the piston rod, as by the pin 78, and pivotally secured in the fulcrum post, as by the pin 80, and connected to the cup member 28 by a ball and socket connection, illustrated generally by the numeral 82. It may be seen that vertical movement of the piston 64 in the cylinder 62 will actuate the clamping cup 28.

A pressure regulator 84 of any well known type is secured to the table 48, as by the nut 86. An inlet conduit 88 passes air to the pressure regulator from a suitable source and a conduit 90 conveys the air to a conventional four way air valve 92. From the air valve 92, a first conduit 94 communicates with the lower side of the cylinder 62, as at 96, and a second conduit 98 connects the air valve 92 with the upper portion of the cylinder 62, as by the coupling 100. A fourth port on the air valve 92, not shown, provides for an exhaust from one side or the other of the cylinder. A handle 102 on the air valve 92 directs the air flow to one side of the piston or the other and exhausts the air from the opposite side.

The conduit 104 connects the pressure regulator 84 with a pressure gage 106, which is mounted on a plate 108 conveniently disposed with respect to the table 48. The pressure gage 106 may be of any conventional type and is preferably a gage registering between 0 and 100 p.s.i. The purpose of the pressure gage 106 is to indicate the pressure of the air flowing through the regulator 84 and to the clamping cylinder 62.

A second conventional pressure regulator 110 is secured to the table 48, as by the nut 112, and has an inlet conduit 114 supplying air or fluid from a suitable source to the regulator. A first conduit 116 connects the pressure regulator 110 with a pressure gage 118 mounted on the panel 108, the pressure gage 118 being of a conventional nature and registering preferably in the range of from 0 to 5 p.s.i.

A second conduit 120 from the pressure regulator 110 connects the pressure regulator with the lower end of a conventional flow meter 40. The upper end of the flow meter 40 is connected to the lower member 20 by a conduit 122 and communicates with a passage 124 in the lower member. The passage 124 communicates in turn with the chamber 18 defined by the inward step in the seal receiving block 47 and allows air to pass between the seal 10 and the stub shaft 26. An O-ring 126 prevents air leakage between the seal receiving block 47 and the lower member 20 and an O-ring 128 prevents air leakage around the base of the stub shaft 26.

In order to vertically reciprocate the block 54 and the stub shaft 26 so that the various diameters 56 and 58 are brought into contact with the seal 10, an assembly best illustrated in FIGURE 3 may be utilized. A first shaft 130 is journaled in the lower member 20 and has a pinion 132 rotatably secured thereon. The pinion 132 engages a plurality of teeth 134 formed along a surface element of the block 54 such that rotation of the shaft 130 and the pinion 132 will raise and lower the stub shaft 26, in the nature of a rack and pinion. The first shaft 130 enters the lower member 20 through a bushing 136 which is insulated from air leakage by an O-ring 138. A second O-ring 140 prevents leakage of air along the shaft 130. A spur gear 142 is secured on the end of the shaft 130 and is adapted to engage a second spur gear 144 secured on the end of a second shaft 146. The second shaft is rotatably supported in a block 150 which is secured to the table 48 as by the bolts 152. Bearings 154 allow free movement of the shaft 146 in the block 150. A handle 156 is secured to the shaft 146 by the set screw 158, seated on a flat 160 formed on the end of a shaft 146. Thus, it may be seen that rotation of the handle 156 will cause rotation of the shaft 146, the spur gears 144 and 142 and rotation of the shaft 130, to raise or lower the block 54 and the stub shaft 26. The handle 156 extends through an opening 157 in the plate 48, in a convenient position adjacent the top of the device.

The operation of the device shown in FIGURES 1 and 2 is as follows: A seal 10 is placed in the seal retaining block 47. The pressure regulator 84 allows fluid to pass to the air valve 92 and the handle 102 is placed in a position to admit air to the lower side of the piston 64 in the cylinder 62. The upper side of the piston is allowed to exhaust through the conduit 98 and the air valve 92. The piston and piston rod are thus raised, rotating the beam 76 about the fulcrum post 72 and lowering the clamping cup 28 to the seal 10. The pressure regulator 110 allows air to flow through the flow meter 40 and to the chamber 18 in the seal receiving block 46. Air then flows between the seal and the stub shaft 26 which has been raised by operation of handle 156 to bring minimum diameter 56 into checking relationship with seal 10. Air escapes to the atmosphere through the perforations 159 in the cup member 28. If the seal is of the correct diameter, concentricity, etc., the indicator 162 in the flow meter will register above the predetermined minimum acceptable limit. The handle 156 is then further advanced to raise the larger diameter 58 of the stub shaft 26 into the seal 10 and the amount of air flow between the seal and the shaft portion 58 is determined on the flow meter. Again, if the flow rate measured by the indicator 162 stays below the predetermined maximum limit, the seal is assumed to be acceptable.

A second modification of the device is shown in FIGURES 5 and 6. A pair of tables 164 are secured to a cover plate 166, which raises the tables to a desired and workable height. A pair of seal receiving blocks 168 are secured to the table in any suitable manner, the blocks having the recessed seat 16 and chamber 18 formed therein. Stub shafts 170 are secured to the tables 164 by the bolts 172.

The clamping means for retaining the seal 10 in the block 168 may be of any suitable form, but are here illustrated as being of the mechanical or toggle type. Cups 174, having perforations 176 therein, are connected by ball and socket connections 178 to the pivoting beams 180. Handles 182, which are pivoted to the posts 184, actuate the beams 180 and raise or lower the cups 174 into or out of engagement with the seals 10. The posts 184 are secured to blocks 186 which in turn are secured to the tables 164. The connections may be made by the bolts 188.

A pair of conventional pressure regulators 190 are secured to the cover plate 166, as by the nuts 192. Air inlet means are provided to the pressure regulators from a suitable source, and the conduits 194 connect the pressure regulators with the pressure gages 196. The pressure gages may be of any well known type and are preferably designed to indicate pressures in the range of 0 to 5 p.s.i. The conduits 198 connect the pressure regulators 190 to the flow meters 200, which may be of any suitable type. The flow meters 200 and the pressure gages 196 are mounted on a plate 202, secured to the cover plate 166 in a convenient position with respect to the remainder of the device. Conduits 204 connect the upper portions of the flow meters to the respective seal retaining blocks 168 and communicate with the chambers 18. Thus, through flow is provided from the pressure regulator inlets, through the pressure regulators, through the flow meters and to the seal retaining blocks 168.

The operation of the device shown in FIGURES 5 and 6 is as follows: Stub shafts 170 of slightly different diameters are placed in the two seal receiving blocks 168. The two stub shafts may represent the maximum and minimum limits of an acceptable range of seal diameters. A seal is placed in one of the blocks 168 and the handle 182 of the associated clamping assembly is raised to lower the beam 180 and the clamping cup 174 to retain the seal 10 in the proper position in the seal receiving block 168. The pressure regulator then allows the flow of air through the flow meter and to the chamber 18, allowing fluid flow between the seal 10 and the stub shaft 170. The amount of fluid flow is indicated on the flow meter 200 associated with that unit, and if the indicator 206 remains within the predetermined desired limits the seal is found to be acceptable. The seal is then removed by releasing the clamp handle 182 and raising the cup 174, and placed in the other seal receiving block. The cycle is repeated with that unit to determine the acceptability of the seal with a shaft of that diameter.

The device illustrated in FIGURES 5 and 6 may be used with a plurality of stub shafts of varying diameters which may easily be inserted in the seal receiving blocks 168. The device is thus adaptable to a large range of shaft seals and available for a greater amount of production usage.

It may be noted from the foregoing description that the device as illustrated employs the use of air as the operating fluid. It may further be noted that the particular type of seal illustrated and described is of the lip type. It is not desired to limit the device to the use of air as the operating fluid or to restrict the device to the quality checking of lip type seals. It is obvious from the foregoing description that it is within the spirit of the invention to use the device for any conventional type seal and with any suitable operating fluid.

The claims:

1. An apparatus for checking the quality of flexible shaft seals comprising a table, a block secured to said table and having a seal receiving recess formed therein, a stub shaft secured to said table and concentrically disposed within said recess such that an annular flexible seal received in said recess will surround said shaft in close fitting engagement therewith, a clamp mounted on said table to secure a flexible seal received in said recess, means for supplying air to said recess such that air will flow between said seal and said shaft, and means to indicate the amount of air flowing between said seal and said shaft as a determination of the qualtiy of said seal.

2. An apparatus for checking the quality of flexible shaft seals comprising a block having an inwardly decreasing annularly stepped recess formed therein, a stub shaft axially disposed in said recess and concentric therewith, a flexible seal received in the upper portion of said stepped recess and around said stub shaft, clamping means for retaining said seal in said recess, a fluid supply conduit communicating with the inward portion of said stepped recess to allow fluid to pass between said seal and said stub shaft, pressure regulating means in said conduit for regulating the pressure of the fluid flowing therethrough, and flow indicating means in said conduit and between said pressure regulating means and said stepped recess to indicate the amount of fluid flowing between said seal and said stub shaft to establish the quality of said seal.

3. An apparatus for checking the quality of flexible shaft seals comprising a table, an upper member secured to said table and having a seal receiving recess formed in the upper surface thereof, a lower member secured to said table and below said upper member, said lower member being axially disposed with respect to said upper member, a block disposed in said lower member and axially located with respect to said seal receiving recess in said upper member, means for vertically reciprocating said block in said lower member, a stepped stub shaft having portions of relatively smaller and larger diameters, said stub shaft being secured in said block and reciprocable therewith to enter a seal placed in said recess with first the smaller diameter and secondly the larger diameter, fluid operated clamping means secured to said table to secure a seal in said seal receiving recess, fluid inlet and passage means communicating with said seal receiving recess to allow fluid flow between a seal mounted in said recess and said stub shaft, and flow indicating means in said fluid inlet and passage means to indicate the amount of fluid flow between a seal mounted in said recess and said stub shaft as a determination of the quality of a flexible shaft seal.

4. An apparatus for checking the quality of flexible shaft seals comprising a table, an upper member secured to said table and having a seal receiving recess formed therein, a lower member secured to said table and axially disposed below said upper member, a block disposed in said lower member and concentrically located with respect to said seal receiving recess, means for vertically reciprocating said block in said lower member, a stub shaft secured in said block and reciprocable therewith, said stub shaft having cylindrical portions of different diameters such that one portion may be first raised into an annular seal secured in said recess and a second portion raised into said seal as said block and said stub shaft are moved by said reciprocating means, a fluid cylinder secured to said table and having a piston reciprocable therein, a piston rod extending from said piston and adjacent said upper member, a fulcrum post secured to said table and between said piston rod and said upper member, a beam pivotally secured to said piston rod and to said fulcrum post and extending over said upper member, a perforated cup member secured to the end of said beam and over said seal receiving recess in said upper member and movable by the actuation of said piston in said cylinder to abut and clamp a seal disposed in said recess, fluid supply and valve means operably connected to said cylinder for actuation of said piston to clamp or unclamp a seal disposed in said recess, fluid inlet and passage means communicating with said seal receiving recess to allow fluid flow between a seal mounted in said recess and said stub shaft, and flow indicating means in said fluid inlet and passage means to indicate the amount of fluid flow between the seal in said recess and said stub shaft as a determination of the quality of a flexible shaft seal.

5. The apparatus set forth in claim 4 wherein said fluid supply and valve means including a pressure regulator secured to said table and having fluid inlet means operatively connected thereto, a pressure gage adjacent said table and operably connected to said pressure regulator to indicate the pressure of the fluid flowing from said pressure regulator, a fluid valve operatively connected to said pressure regulator and having conduit means extending therefrom and communicating with said cylinder on opposite sides of said piston, and a handle on said fluid valve to direct fluid flow when in one position from said pressure regulator to said cylinder on the first side of said piston and exhaust said cylinder on the second side of said piston to raise said piston and said piston rod and lower said cup member, said handle when in another position directing fluid flow from said pressure regulator to said cylinder on the second side of said piston and exhausting the cylinder on the first side of said piston to lower said piston and said piston rod and raise said cup member for removal of a flexible seal disposed in said seal receiving recess.

6. An apparatus for checking the quality of flexible shaft seals comprising a table, an upper member secured to said table and having a seal receiving recess formed in the upper surface thereof, a lower member secured to said table and below said upper member, said lower member being axially disposed with respect to said upper member, a block disposed in said lower member and axially located with respect to said seal receiving recess in said upper member, means for vertically reciprocating said block in said lower member, a stepped stub shaft having portions of relatively smaller and larger diameters, said stub shaft being secured in said block and reciprocable therewith to enter a seal placed in said recess with first the smaller diameter and secondly the larger diameter, fluid operated clamping means secured to said table to secure a seal in said seal receiving recess, fluid pressure regulating means secured to said table and having fluid inlet means operably connected thereto, pressure indicating means adjacent said table and operably connected to said pressure regulating means to indicate the pressure of the fluid flowing from said pressure regulating means, flow indicating means adjacent said table and operably connected to said pressure regulating means, and a conduit operably connected to said flow indicating means and communicating with said seal receiving recess such that fluid from said fluid pressure regulating means and through said flow indicating means will flow between a seal secured in said recess and said stub shaft, the amount of flow therebetween as indicated on said flow indicating means being a measure of the quality of the flexible seal so disposed in said recess.

7. An apparatus for checking the quality of flexible shaft seals comprising a table, an upper member secured to said table and having a seal receiving recess formed in the upper surface thereof, a lower member secured to said table and below said upper table, said lower member being axially disposed with respect to said upper member, a block disposed in said lower member and axially located with respect to said seal receiving recess in said upper member, a plurality of teeth formed along a vertical surface element of said block, a first shaft journaled in said lower member and having a pinion thereon engaging said teeth in said block, a gear on the outer end of said first shaft, a second shaft rotatably supported on said table and having a gear on one end thereof engaging said gear on said first shaft, a handle operatively connected to said second shaft such that movement of said handle will rotate said second shaft and said gears and said first shaft and said pinion to move said block in a vertical direction in said lower member, a stepped stub shaft having portions of relatively smaller and larger diameters, said stub shaft being secured in said block and reciprocable therewith to enter a seal placed in said recess with first the smaller diameter and secondly the larger diameter, fluid operated clamping means secured to said table to secure a seal in said seal receiving recess, fluid inlet and passage means communicating with said seal receiving recess to allow fluid flow between a seal mounted in said recess and said stub shaft, and flow indicating means in said fluid inlet and passage means to indicate the amount of fluid flow between a seal and said stub shaft as a determination of the quality of a flexible shaft seal.

8. An apparatus for checking the quality of flexible shaft seals comprising a table, an upper member secured to said table and having a seal receiving recess formed therein, a lower member secured to said table and axially disposed below said upper member, a block disposed in said lower member and concentrically located with respect to said seal receiving recess, means for vertically reciprocating said block in said lower member, a stub shaft secured in said block and reciprocable therewith, said stub shaft having cylindrical portions of different diameters such that one portion may be raised into and through an annular seal secured in said recess and a second portion raised into the seal as said block and said stub shaft are moved by said reciprocating means, a fluid cylinder secured to said table and having a piston reciprocable therein, a piston rod extending from said piston and adjacent said upper member, a fulcrum post secured to said table and between said piston rod and said upper member, a beam pivotally secured to said piston rod and to said fulcrum post and extending over said upper member, a perforated cup member secured to the end of said beam and over said seal receiving recess in said upper member and movable by the actuation of said piston in said cylinder to abut and clamp a seal disposed in said recess, fluid supply and valve means operably connected to said cylinder for actuation of said piston to clamp or unclamp a seal disposed in said recess, fluid pressure regulating means secured to said table and having fluid inlet means operably connected thereto, pressure indicating means adjacent said table and operably connected to said pressure regulating means to indicate the pressure of the fluid flowing in said pressure regulating means, flow indicating means adjacent said table and operably connected to said pressure regulating means, and a conduit operably connected to said flow indicating means and communicating with said seal receiving recess such that fluid from said pressure regulating means and through said flow indicating means will flow between a seal secured in said recess and said stub shaft, the amount of flow therebetween as indicated on said flow indicating means being a measure of the quality of the flexible seal so disposed in said recess.

9. An apparatus for checking the quality of flexible shaft seals comprising a table, an upper member secured to said table and having a seal receiving recess formed therein, a lower member secured to said table and axially disposed below said upper member, a block disposed in said lower member and concentrically located with respect to said seal receiving recess, a plurality of teeth formed along a vertical surface element of said block, a first shaft journaled in said lower member and having a pinion thereon engaging said teeth in said block, a gear on the outer end of said first shaft, a second shaft rotatably supported on said table and having a gear on one end thereof engaging said gear on said first shaft, a handle operatively connected to said second shaft such that movement of said handle will rotate said second shaft and said gears and said first shaft and said pinion to move said block in a vertical direction in said lower member, a stub shaft secured in said block and reciprocable therewith, said stub shaft having cylindrical portions of different diameters such that one portion may be raised into and through an annular seal secured in said recess and a second portion raised into the seal as said block and said stub shaft are moved by the action of said handle and said first and second shafts and said gears and said pinion, a fluid cylinder secured to said table and having a piston reciprocable therein, a piston rod extending from said piston and adjacent said upper member, a fulcrum post secured to said table and between said piston rod and said upper member, a beam pivotally secured to said piston rod and to said fulcrum post and extending over said upper member, a perforated cup secured to the end of said beam and over said seal receiving recess in said upper member and movable by the actuation of said piston in said cylinder to abut and clamp a seal disposed in said recess, fluid supply and valve means operably connected to said cylinder for actuation of said piston to clamp or unclamp a seal disposed in said recess, fluid inlet and passage means communicating with said seal receiving recess to allow fluid flow between a seal mounted in said recess and said stub shaft, and flow indicating means in said fluid inlet and passage means to indicate the amount of fluid flowing between a seal and said stub shaft as a determination of the quality of a flexible shaft seal.

10. An apparatus for checking the quality of flexible shaft seals comprising a table, an upper member secured to said table and having a seal receiving recess formed in the upper surface thereof, a lower member secured to said table and below said upper member, and said lower member being axially disposed with respect to said upper member, a block disposed in said lower member and axially located with respect to said seal receiving recess in said upper member, a plurality of teeth formed along a vertical surface element of said block, a first shaft journaled in said lower member and having a pinion therein engaging said teeth in said block, a gear on the outer end of said first shaft, a second shaft rotatably supported on said table and having a gear on one end thereof engaging said gear on said first shaft, a handle operably connected to said second shaft such that movement of said handle will rotate said second shaft and said gears and said first shaft and said pinion to move said block in a vertical direction in said lower member, a stepped stub shaft having portions of relatively smaller and larger diameters, said stub shaft being secured in said block and reciprocable therewith to enter a seal placed in said recess with first the smaller diameter and secondly the larger diameter, fluid operated clamping means secured to said table to secure a seal in said seal receiving recess, fluid pressure regulating means secured to said table and having fluid inlet means operably connected thereto, pressure indicating means adjacent said table and operably connected to said pressure regulating means to indicate the pressure of the fluid flowing from said pressure regulating means, flow indicating means adjacent said table and operably connected to said pressure regulating means, and a conduit operably connected to said flow indicating means and communicating with said seal receiving recess such that fluid from said pressure regulating means and through said flow indicating means will flow between a seal secured in said recess and said stub shaft, the amount of flow therebetween as indicated on said flow indicating means being a measure of the quality of the flexible seal so disposed in said recess.

11. An apparatus for checking the quality of flexible shaft seals comprising a table, an upper member secured to said table and having a seal receiving recess formed therein, a lower member secured to said table and axially disposed below said upper member, a block disposed in said lower member and concentrically located with respect to said seal receiving recess, a plurality of teeth formed along a vertical surface element of said block, a first shaft journaled in said lower member and having a pinion thereon engaging said teeth in said block, a gear on the outer end of said first shaft, a second shaft rotatably secured to said table and having a gear on one end thereof engaging said gear on said first shaft, a handle operably connected to said second shaft such that movement of said handle will rotate said second shaft and said gears and said first shaft and said pinion to move said block in a vertical direction in said lower member, a stub shaft secured in said block and reciprocable therewith, said stub shaft having cylindrical portions of different diameters such that one portion may be raised into an annular seal in said recess and a second portion raised into the seal as said block and said stub shaft are moved by said reciprocating means, a fluid cylinder secured to said table and having a piston reciprocable therein, a piston rod extending from said piston and adjacent said upper member, a fulcrum post secured to said table and between said piston rod and said upper member, a beam pivotally secured to said piston rod and to said fulcrum post and extending over said upper member, a perforated cup secured to the end of said beam and over said seal receiving recess in said upper member and movable by the actuation of said piston in said cylinder to abut and clamp a seal disposed in said recess, fluid supply and valve means operably connected to said cylinder for actuation of said piston to clamp or unclamp a seal disposed in said recess, fluid pressure regulating means secured to said table and having fluid inlet means operably connected thereto, pressure indicating means adjacent said table and operably connected to said pressure regulating means to indicate the pressure of the fluid flowing from said pressure regulating means, flow indicating means adjacent said table and operably connected to said pressure regulating means, and a conduit operably connected to said flow indicating means and communicating with said seal receiving recess such that fluid from said pressure regulating means and through said flow indicating means will flow between a seal secured in said recess and said stub shaft, the amount of flow therebetween as indicated on said flow indicating means being a measure of the quality of the flexible seal so disposed in said recess.

12. An apparatus for checking the quality of a flexible shaft seal comprising a table, a block mounted on said table, said block having a seal receiving recess formed therein and a smaller recess axially formed with respect to said seal receiving recess, a stub shaft secured to said block and in said seal receiving recess and said smaller recess and concentrically disposed with respect to said seal receiving recess, clamping means secured to said table and adjacent said block to clamp and retain a seal in said seal receiving recess, air inlet and passage means adjacent said table and communicating with said smaller recess in said block to admit air flow to said seal receiving recess and between a seal clamped in said seal receiving recess and said stub shaft, and air flow indicating means in said air supply and passage means to indicate the amount of air flowing therethrough as a determination of the quality of a flexible shaft seal so disposed in said recess.

13. An apparatus for checking the quality of a flexible shaft seal comprising a table, a first block secured to said table and having a seal receiving recess formed therein, a first stub shaft secured to said table and within said first block and concentrically disposed with respect to said recess, a second block secured to said table and having a seal receiving recess formed therein, a second stub shaft of a slightly different diameter than said first stub shaft secured to said table and within said second block and concentrically disposed with respect to said seal receiving recess, each of said blocks having clamping means associated therewith and secured to said table to clamp and retain shaft seals in said seal receiving recesses, first and second fluid inlet and passage means adjacent said table and communicating with said first and second seal receiving recesses to admit fluid flow to said recesses and between seals clamped therein and said first and second stub shafts, said fluid inlet and passage means being independently operative, and first and second flow indicating means operatively connected in said first and second fluid inlet and passage means to indicate the amount of fluid flowing between the seals mounted in said recesses and said stub shafts as a measure of the quality of the flexible shaft seals so disposed.

14. An apparatus for checking the quality of annular flexible shaft seals comprising support means, a seal-receiving seat provided on said support means, a stub shaft movably mounted relative to said seat, means for disposing said stub shaft concentrically within said seat such that an annular seal received in said seat will surround said shaft in close fitting engagement therewith, means for supplying air to the area of engagement between said seal and said shaft such that air will flow between said seal and said shaft, and means to indicate the amount of air flowing between said seal and said shaft as a determination of the quality of said flexible seal.

15. An apparatus for checking the quality of annular flexible shaft seals comprising support means, an annular seal-receiving seat provided on said support means, a stub shaft mounted on said support means and concentrically disposed within said seat such that an annular seal received in said seat will surround said shaft in close fitting engagement therewith, a clamp mounted on said support means to secure a seal received in said seat, means for supplying air for flow between said seal and said shaft, and means to indicate the amount of air flowing between said seal and said shaft as a determination of the quality of said flexible seal.

16. An apparatus for checking the quality of annular flexible shaft seals comprising support means, an annular seal-receiving seat on said support means, a stub shaft having portions of relatively smaller and larger diameters, means for moving said stub shaft to enter a seal placed in said seat with first one portion and then the other portion of said stub shaft, means for supplying air for flow between said seal and said stub shaft portions, and means to indicate the amount of air flowing between said seal and said stub shaft portions as a determination of the quality of said flexible seal.

17. An apparatus for checking the sealing quality of shaft-type seals having a radially extending flexible lip portion, a test mandrel dimensioned to simulate a shaft with which said seals are to be associated in normal use, seal retaining means to support one of said seals and to position the lip portion thereof circumjacent said test mandrel and in peripheral contact therewith, said seal retaining means and said one of said seals and said test mandrel defining a fluid cavity, a fluid pressure source, conduit means to supply fluid from said fluid pressure source to said cavity, pressure regulating means to regulate the pressure of said fluid in said conduit means, flow directing means to confine fluid flow from said conduit means to a path along said test mandrel and past the lip portion of said one of said seals, and measuring means to measure the rate of flow of fluid from said conduit means and through said cavity and past the lip portion of said one of said seals between said one of said seals and said test mandrel as an indication of the sealing quality of said one of said seals.

18. A method of testing sealing quality of a production flexible shaft seal subsequent to manufacture and prior to installation, and comprising the steps of, placing said seal in sealing relationship with a test member having predetermined dimensional characteristics, supplying fluid under pressure to a fluid cavity defined by said seal and said test member, circumflexing the seal at the area of sealing contact with the surface of the test member solely by action of the fluid under pressure in the fluid cavity thereby disengaging the seal from sealing relationship with the test member, confining fluid flow from said cavity to a flow path between said seal and said test member, and measuring fluid flow rate past said seal as an indication of sealing quality of said flexible seal.

19. A method of determining the sealing qualities of a flexible shaft seal subsequent to manufacture and prior to installation, and comprising the steps of, mounting the seal in sealing relationship with a test member having predetermined dimensional characteristics, directing fluid under pressure to a cavity defined by said seal and said test member, circumflexing the seal at the area of sealing contact with the surface of the test member solely by action of the fluid under pressure in the fluid cavity thereby disengaging the seal from sealing relationship with the test member, confining fluid flow from said cavity to a path between said seal and said test member, and determining sealing quality of said seal by measuring the rate of fluid flow between said flexible seal and said test member.

20. An apparatus for checking the sealing quality of shaft type seals having a radially extending flexible lip portion, a test mandrel having predetermined dimensional characteristics, seal retaining means to support one of said seals and to position the lip portion thereof circumjacent said test mandrel and in peripheral engagement therewith, said seal retaining means and said one of said seals and said test mandrel defining a fluid cavity, a fluid pressure source, conduit means to supply fluid from said fluid pressure source to said cavity at a predetermined pressure, said fluid cavity confining fluid flow from said conduit means to a path along said test mandrel and past the lip portion of said one of said seals, and measuring means to measure the rate of flow of fluid from said conduit means and through said cavity and past the lip portion of said one of said seals between said one of said seals and said test mandrel as an indication of the sealing quality of said one of said seals.

21. An apparatus for checking the sealing quality of shaft type seals having a radially inwardly extending flexible lip portion defining a central circular cavity, a cylindrical test mandrel having predetermined dimensional characteristics, seal retaining means to support one of said seals and to position the lip portion thereof circumjacent said test mandrel and in peripheral engagement therewith, said seal retaining means and said one of said seals and said test mandrel defining a fluid cavity, a fluid pressure source, conduit means to supply fluid from said fluid pressure source to said cavity, pressure regulating means to regulate the pressure of said fluid in said conduit means, means to confine fluid flow from said conduit means to a path along said test mandrel and past the lip portion of said one of said seals, and measuring means to measure the rate of flow of fluid from said conduit means and through said cavity and past the lip portion of said one of said seals between said one of said seals and said test mandrel as an indication of the sealing quality of said one of said seals.

References Cited in the file of this patent
UNITED STATES PATENTS

| | | |
|---|---|---|
| 900,324 | Swangren | Oct. 6, 1908 |
| 2,241,526 | Rosenkranz | May 13, 1941 |
| 2,342,616 | O'Brien | Feb. 22, 1944 |
| 2,465,035 | Polk et al. | Mar. 22, 1949 |
| 2,478,628 | Hansen | Aug. 9, 1949 |
| 2,578,031 | Aubrey | Dec. 11, 1951 |
| 2,581,536 | Johns | Jan. 8, 1952 |
| 2,636,514 | Woodward | Apr. 28, 1953 |
| 2,691,297 | Kreisel et al. | Oct. 12, 1954 |
| 2,737,803 | Doudera | Mar. 13, 1956 |
| 2,784,373 | Lawrance | Mar. 5, 1957 |
| 2,799,944 | McConnell | July 23, 1957 |
| 2,863,316 | Abplanalp | Dec. 9, 1958 |
| 2,953,015 | Carrie | Sept. 20, 1960 |